United States Patent
Brown et al.

(10) Patent No.: US 9,405,704 B2
(45) Date of Patent: Aug. 2, 2016

(54) ESTABLISHING A POINT-IN-TIME COPY RELATIONSHIP BETWEEN SOURCE LOGICAL ADDRESSES AND TARGET LOGICAL ADDRESSES

(71) Applicant: International Business Machines Corporation, Armonk, NY (US)

(72) Inventors: Theresa M. Brown, Tucson, AZ (US); Carol S. Mellgren, Tucson, AZ (US); Nedlaya Y. Francisco, Tucson, AZ (US); Jared M. Minch, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 13/653,342

(22) Filed: Oct. 16, 2012

(65) Prior Publication Data

US 2014/0108750 A1   Apr. 17, 2014

(51) Int. Cl.
*G06F 12/00* (2006.01)
*G06F 12/10* (2016.01)
*G06F 11/14* (2006.01)

(52) U.S. Cl.
CPC .......... *G06F 12/109* (2013.01); *G06F 11/1451* (2013.01); *G06F 11/1458* (2013.01); *G06F 11/1466* (2013.01); *G06F 2212/1032* (2013.01); *G06F 2212/152* (2013.01)

(58) Field of Classification Search
CPC .................................................. G06F 11/1446
See application file for complete search history.

(56) References Cited

U.S. PATENT DOCUMENTS

| 6,041,386 A | 3/2000 | Bello |
| 6,611,901 B1 * | 8/2003 | Micka et al. ................ 711/162 |

(Continued)

FOREIGN PATENT DOCUMENTS

| CN | 1704903 | 12/2005 |
| CN | 101206596 | 6/2008 |

(Continued)

OTHER PUBLICATIONS

PCT International Search Report and Written Opinion dated May 16, 2014, pp. 10, for Application No. PCT/IB2013/059346, filed Oct. 14, 2013.

(Continued)

*Primary Examiner* — Daniel Tsui
(74) *Attorney, Agent, or Firm* — David W. Victor; Konrad Raynes Davda & Victor LLP

(57) ABSTRACT

Provided are a computer program product, system, and method for establishing a point-in-time copy relationship between source logical addresses and target logical addresses. A point-in-time (PiT) copy establish command specifies a source set comprising a subset of source logical addresses in at least one storage and a target set comprising a subset of target logical addresses in the at least one storage. The source set of source logical addresses are copied to the target set of target logical addresses. The source logical addresses map to source tracks and wherein the target logical addresses map to target tracks. Copy information is generated indicating whether the source logical addresses in the source set have been copied to the target set. Complete is returned to the PiT copy establish command after generating the copy information and before copying all the source logical addresses to the target logical addresses.

19 Claims, 6 Drawing Sheets

(56) References Cited

U.S. PATENT DOCUMENTS

| | | | |
|---|---|---|---|
| 6,757,797 | B1 | 6/2004 | Kaiya et al. |
| 7,509,535 | B1 | 3/2009 | Gulve et al. |
| 9,104,626 | B2 | 8/2015 | Brown et al. |
| 9,116,852 | B2 | 8/2015 | Brown et al. |
| 2003/0028737 | A1 | 2/2003 | Kaiya et al. |
| 2004/0221125 | A1 | 11/2004 | Ananthanarayanan et al. |
| 2005/0188251 | A1 | 8/2005 | Benhase et al. |
| 2006/0129773 | A1 | 6/2006 | Watanabe et al. |
| 2008/0244205 | A1 | 10/2008 | Amano et al. |
| 2009/0144345 | A1 | 6/2009 | Werner et al. |
| 2009/0187613 | A1* | 7/2009 | Spear et al. ............... 707/204 |
| 2009/0198940 | A1 | 8/2009 | Ash et al. |
| 2011/0219192 | A1 | 9/2011 | Hutchison et al. |
| 2012/0079224 | A1* | 3/2012 | Clayton et al. ............. 711/162 |
| 2012/0173830 | A1 | 7/2012 | Gundy et al. |
| 2012/0216000 | A1 | 8/2012 | Thompson et al. |
| 2012/0221816 | A1 | 8/2012 | Hutchison et al. |
| 2012/0278559 | A1 | 11/2012 | Hutchison et al. |
| 2014/0108757 | A1 | 4/2014 | Brown et al. |

FOREIGN PATENT DOCUMENTS

| | | |
|---|---|---|
| CN | 101276300 | 10/2008 |
| EP | 2 214 102 | 1/2010 |
| JP | 200166974 | 6/2001 |
| JP | 2004326801 | 11/2004 |
| JP | 2006164162 | 6/2006 |
| JP | 2012507097 | 3/2012 |
| WO | 2004051473 | 6/2004 |

OTHER PUBLICATIONS

English translation of CN1074903 dated Feb. 7, 2005.
English translation of CN101206596 dated Jun. 25, 2008.
English translation of CN101276300 dated Oct. 1, 2008.
"DFSMS Advanced Copy Services", IBM Corporation, IBM Document No. SC35-0428-18, 1994, pp. 1-815.
Rooney et al., "IBM TotalStorage Productivity Center for Replication for z/OS", IBM Corporation, IBM Systems Journal, vol. 47, No. 4, 2008, pp. 681-694.
"Working Draft SCSI Extended Copy Command", T10/99-143r1, Apr. 2, 1999, pp. 1-34.
"FlashCopy establish (FCESTABL) command", IBM Corporation, [online][retrieved Aug. 28, 2012] http://publib.bouder.ibm.com/infocenter/zos/v1r12/topic/com.ibm.zos.rl . . . .
U.S. Appl. No. 13/653,347, filed Oct. 16, 2012, by inventors T.M. Brown, N.Y. Francisco, C.S. Mellgren, J.M.Minch and R.E. Saba, IBM.
U.S. Appl. No. 13/653,349, filed Oct. 16, 2012, by inventors T.M. Brown, N.Y. Francisco, C.S. Mellgren, J.M.Minch and R.E. Saba, IBM.
PCT International Search Report and Written Opinion dated Mar. 11, 2014, pp. 9, for Application No. PCT/IB2013/059345, filed Oct. 14, 2013.
English translation of JP2001166974 dated Jun. 22, 2001.
English translation of JP2004326801 dated Nov. 18, 2004.
English translation of JP2006164162 dated Jun. 22, 2006.
English translation of JP2012507097 dated Mar. 22, 2012.
US6757797 is the US counterpart of JP2001166974.
US20030028737 is the US counterpart of JP200166974.
US20040221125 is the US counterpart of JP2004326801.
US20060129773 is the US counterpart of JP2006164162.
US20110219192 is the US counterpart of JP2012507097.
US20120278559 is the US counterpart of JP2012507097.
Response dated Jan. 23, 2015, pp. 8, to Office Action dated Oct. 23, 2014, pp. 22, for U.S. Appl. No. 13/653,347, filed 2012-16.
Response dated Jan. 23, 2015, pp. 4, to Office Action dated Oct. 24, 2014, pp. 18, for U.S. Appl. No. 14/070,384, filed Nov. 1, 2013.
Response dated Jan. 23, 2015, pp. 14, to Office Action dated Oct. 23, 2014, pp. 27, for U.S. Appl. No. 13/653,349, filed Oct. 16, 2012.
Office Action dated Oct. 23, 2014, pp. 27, for U.S. Appl. No. 13/653,349, filed Oct. 16, 2012.
Office Action dated Oct. 23, 2014, pp. 22, for U.S. Appl. No. 13/653,347, filed 2012-16.
Office Action dated Oct. 24, 2014, pp. 18, for U.S. Appl. No. 14/070,384, filed Nov. 1, 2013.
Notice of Allowance dated Apr. 1, 2015, pp. 11, for U.S. Appl. No. 13/653,347, filed 2012-16.
Notice of Allowance dated Apr. 1, 2015, pp. 11, for U.S. Appl. No. 14/070,384, filed Nov. 1, 2013.
Notice of Allowance dated Apr. 2, 2015, pp. 11, for U.S. Appl. No. 13/653,349, filed Oct. 16, 2012.
UK Examination Report dated May 11, 2015, for U.S. Appl. No. GB1506963.6, filed Oct. 14, 2013.
U.S. Appl. No. 14/731,345, filed Jun. 4, 2015.
U.S. Appl. No. 14/735,539, filed Jun. 10, 2015.
Office Action dated Jan. 14, 2016, pp. 24, for U.S. Appl. No. 14/731,345, filed Jun. 4, 2015.
Response dated Apr. 14, 2016, pp. 11, to Office Action dated Jan. 14, 2016, pp. 24, for U.S. Appl. No. 14/731,345, filed Jun. 4, 2015.

* cited by examiner

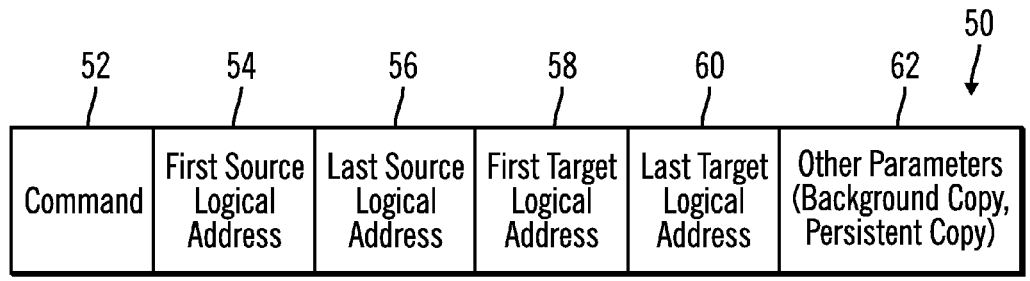
Point-in-Time (PiT) Copy Establish Command
FIG. 2
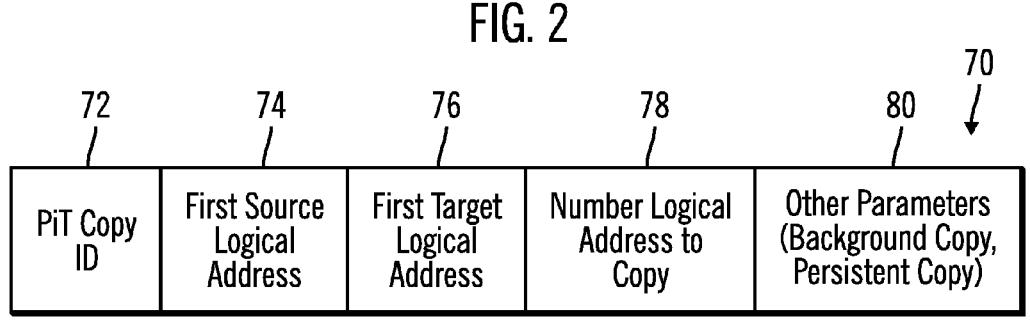
Source/Target Relationship Information
FIG. 3
| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
Copy Map
FIG. 4

ESTABLISHING A POINT-IN-TIME COPY RELATIONSHIP BETWEEN SOURCE LOGICAL ADDRESSES AND TARGET LOGICAL ADDRESSES

BACKGROUND OF THE INVENTION

1. Field of the Invention

The present invention relates to a computer program product, system, and method for establishing a point-in-time copy relationship between source logical addresses and target logical addresses.

2. Description of the Related Art

In a storage environment, volumes may be copied to other volumes to provide redundant copies of data or to store data as of a point-in-time. Snapshot is a common industry term denoting the ability to create a point-in-time (PiT) copy of all the data. Typically, snapshot creation is done instantly and the data is copied only when modified, referred to as a copy-on-write, in order to preserve the data as of the point-in-time the snapshot was created. Further, a background copy operation may be specified to copy the source data in the background to the target site to provide a redundant copy of the source data. A snapshot or PiT copy may be created using PiT copy techniques, such as IBM FlashCopy® (FlashCopy is a registered trademark of International Business Machines, Corp. or "IBM").

To establish a PiT copy relationship between source data and target data, the IBM Data Facility Storage Management Subsystem (DFSMS) available with the IBM z/OS® operating system provides a FlashCopy establish (FCESTABL) command that allows the user to specify a source volume to copy to a target volume. The user may specify to only copy data in the source volume that is updated or to perform a background copy of the source volume to the target volume. (z/OS is a registered trademark of IBM in the United States and other countries).

The FCESTABL command also allows the user to specify a list of extents for the PiT copy, which comprises contiguous tracks that are less than all of the source volume and the target volume. The extents specified in the FCESTABL command indicate the first and last tracks on the source and target devices, which may be specified in cylinder and head number.

There is a need in the art for improved techniques for establishing a PiT copy relationship.

SUMMARY

Provided are a computer program product, system, and method for establishing a point-in-time copy relationship between source logical addresses and target logical addresses. A point-in-time (PiT) copy establish command specifies a source set comprising a subset of source logical addresses in at least one storage and a target set comprising a subset of target logical addresses in the at least one storage. The source set of source logical addresses are copied to the target set of target logical addresses, wherein the source logical addresses map to source tracks and wherein the target logical addresses map to target tracks. In response to processing the PiT copy establish command, copy information is generated indicating the source set of source logical addresses and the target set of target logical addresses and indicating whether the source logical addresses in the source set have been copied to the target set. Complete is returned to the PiT copy establish command after generating the copy information and before copying all the source logical addresses to the target logical addresses.

BRIEF DESCRIPTION OF THE DRAWINGS

FIG. 2 illustrates an embodiment of a PiT copy establish command to establish a PiT copy relationship.

FIG. 3 illustrates an embodiment of source/target relationship information.

FIG. 4 illustrates an embodiment of a copy map for the PiT copy relationship.

DETAILED DESCRIPTION

Described embodiments provide techniques for establishing PiT copy relationship between a source set of source logical addresses comprising a subset of the logical addresses, such as in a source volume, and target set of target logical addresses comprising a subset of the logical addresses, such as in a target volume, where the logical addresses map to tracks. Further, described embodiments provide techniques for copying source data for first and/or last target tracks that only partially include source logical addresses being copied as part of the establish operation. In this way a copy map indicating the target logical addresses in a target location, such as a target volume, that need to be copied may not indicate that the first and/or last target tracks that are updated with data during the establish operation need to be copied. Described embodiments further allow for a PiT copy relationship for distributed systems that use volumes and logical block addresses.

Figure 1:
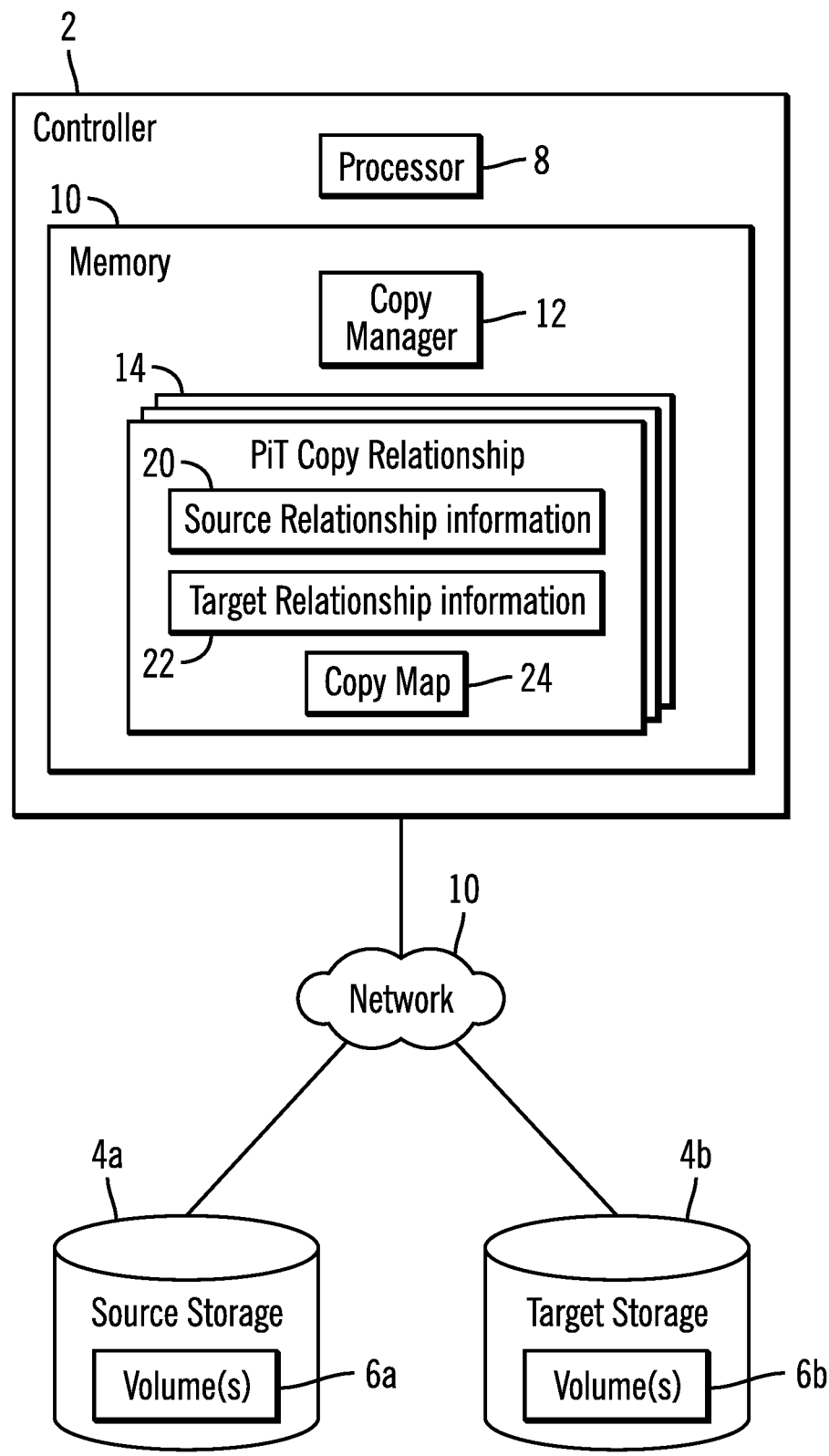
FIG. 1 illustrates an embodiment of a computing environment.

FIG. 1 illustrates an embodiment of a computing environment having a controller 2 to copy data from a coupled source storage 4a having one or more logical volumes 6a to a coupled target storage 4b having one or more volumes 6b. The controller 2 includes a processor 8 and memory 10. Hosts (not shown) may direct read and write requests to the first controller 6a to access tracks in the first storage 4a and the second storage 4b. A host write to a track in the first storage 4a in a point-in-time ("PiT") copy relationship 16 may result in the replication of that track to the second storage 4b. In a further embodiment, the target storage 4b may be coupled to a target controller, so that the controller 2 would communicate the PiT data being copied to the target controller to manage the copying to the target storage 4b. The controller 2 may communicate with the storages 4a, 4b over a network 10.

The memory 10 includes a copy manager 12 to copy data from the source storage 4a to the target storage 4b as specified in one or more PiT copy relationships 14. A copy relationship 14 may identify source logical addresses in a source volume 6a to copy to target logical addresses in a target volume 6b. Alternatively, both the source and target logical addresses in the PiT copy relationship 14 may be in a same volume in one of the storages 4a, 4b. The data to copy in the copy relationship 14 may be part of a consistency session or consistency group, such that data is copied in a manner to maintain consistency across all dependent data, so that the order of dependent writes is preserved to make the data consistent as of a point-in-time.

The PiT copy relationship 14 includes source relationship information 20 and target relationship information 22 both providing information on the source and target tracks involved in the copy operation. This information is used to manage I/O requests to the source and target volumes to determine if the I/O requests are to tracks involved in a PiT copy operation. The PiT copy relationship 14 further includes a copy map 24 indicating tracks in the target volume 6b to which source logical addresses in the source set need to be copied.

The copy manager 12 may implement a PiT program such as IBM FlashCopy®, snapshot, and other PiT programs, to perform a PiT copy operation between specified source and target logical addresses in the same or different volumes. or volume. (FlashCopy is a registered trademark of International Business Machines, Corp. or "IBM"). The PiT copy operation may be between a source set of source logical addresses comprising a subset of the logical addresses in a source volume 6a and a target set of target logical addresses comprising a subset of the logical addresses in a target volume 6b. The logical addresses may comprise logical block addresses (LBAs) that map to contiguous tracks in the volumes 6a, 6b.

The copy manager 12 is shown in FIG. 1 as program code loaded into the memory 10 and executed by the processor 8. Alternatively, some or all of the functions of the copy manager 12 may be implemented in hardware devices in the controllers 6a, 6b, such as in Application Specific Integrated Circuits (ASICs), Field Programmable Gate Array (FPGA), etc. The controller 2 may include other programs not shown, such as an operating system and application programs.

The memory 10 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storages 4a, 4b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storages 4a and 4b may store tracks in a Redundant Array of Independent Disks (RAID) configuration where strides of tracks are written across multiple storage devices comprising the storages 4a, 4b. ranks The network 10 may comprise a network such as a Local Area Network (LAN), Storage Area Network (SAN), Wide Area Network (WAN), peer-to-peer network, wireless network, etc.

FIG. 2 illustrates an embodiment of a PiT copy establish command 50 that is submitted within the controller 2 or from an attached host to cause the copy manager 12 to generate a PiT copy relationship 14. The PiT copy establish command 50 includes a command field 52 specifying the PiT copy establish command; a first source logical address 54 to be copied; a last source logical address 56 to be copied; a first target logical address 58 to which the first source logical address 54 is copied; and a last target logical address 60 to which the last source logical address 56 is copied; and other parameters 62, such as a background copy parameter indicating whether a background operation is performed to copy the source logical address to the target logical addresses and indicating whether the source logical addresses should remain persistent after being copied. The command 50 further would indicate the source volume 6a including the source logical addresses and the target volume 6b including the target logical addresses in the PiT copy relationship 14 being established. Additional information may further be indicated, such as the source 6a and target 6b volumes or single volume 6a, 6b in which the copy operation is being performed. The source and target logical addresses may be stored in data storage devices other than logical volumes. From the range of first 54 and last 56 source logical addresses, the number of logical addresses to copy may be determined.

When processing the PiT copy establish command 50, the copy manager 14 generates data structures and information for the PiT copy relationship 14 as shown in FIGS. 3 and 4.

FIG. 3 shows fields 70 included in the source 20 and target 22 relationship information, which includes a PiT copy identifier (ID) 72 identifying the PiT copy for the information; a first source logical address 74 including the first source logical address 54 to copy; a first target logical address 76 to which the first source logical address 74 is copied; a length related to a number of the logical addresses to copy 78, such as in the field 58; and the other parameters 80, such as included in the field 60. The number of logical addresses to copy 78 may alternatively be expressed in other storage units, such as the number of target tracks or extents to copy. The source and target relationship information 70 would further indicate the source volume 6a including the source logical addresses and the target volume 6b including the target logical addresses in the relationship 14. The source and target relationship information 70 may be used to manage access to the source 6a and target 6b volumes, respectively, while the PiT copy relationship 14 is active.

FIG. 4 illustrates and embodiment of a copy map 24, which may comprise a bitmap that includes a cell for each track in the target volume 6b, or target location, including the target set of logical addresses. The cells for the target tracks including the target set of target logical address to receive source logical addresses are set to indicate copy, e.g., "1". The cells representing tracks in the target volume 6b that are not part of the PiT copy relationship, i.e., excluding the target tracks including the target set, may have a value to indicate that they are not to be copied, e.g., "0". Other values and settings could be used to indicate the tracks to copy and the tracks not to copy as part of the PiT copy relationship being established. Thus, each cell set to indicate to copy represents a plurality of target logical addresses involved in the copy operation.

The cells, indicators, in the copy map 24 may each represent a target group of target logical addresses, including target logical addresses in involved in the copy relationship tracks 14. The target groups represented by the indicators, cells, in the copy map 14 may each represent groupings of logical addresses other than tracks. In a further embodiment, the copy map 24 may indicate tracks in the source volume 6a having the source set of logical addresses to copy.

FIGS. 3, 4, and 5 provide an embodiment of information included in the PiT copy establish command, the source and target relationship information, and the copy map. This information described as included in these data structures and commands is not considered to be limiting, and additional and modified information may be included in different embodiments. Further, the information described in FIGS. 3, 4, and 5 may be separated into additional commands and data structures.

Figure 5A:
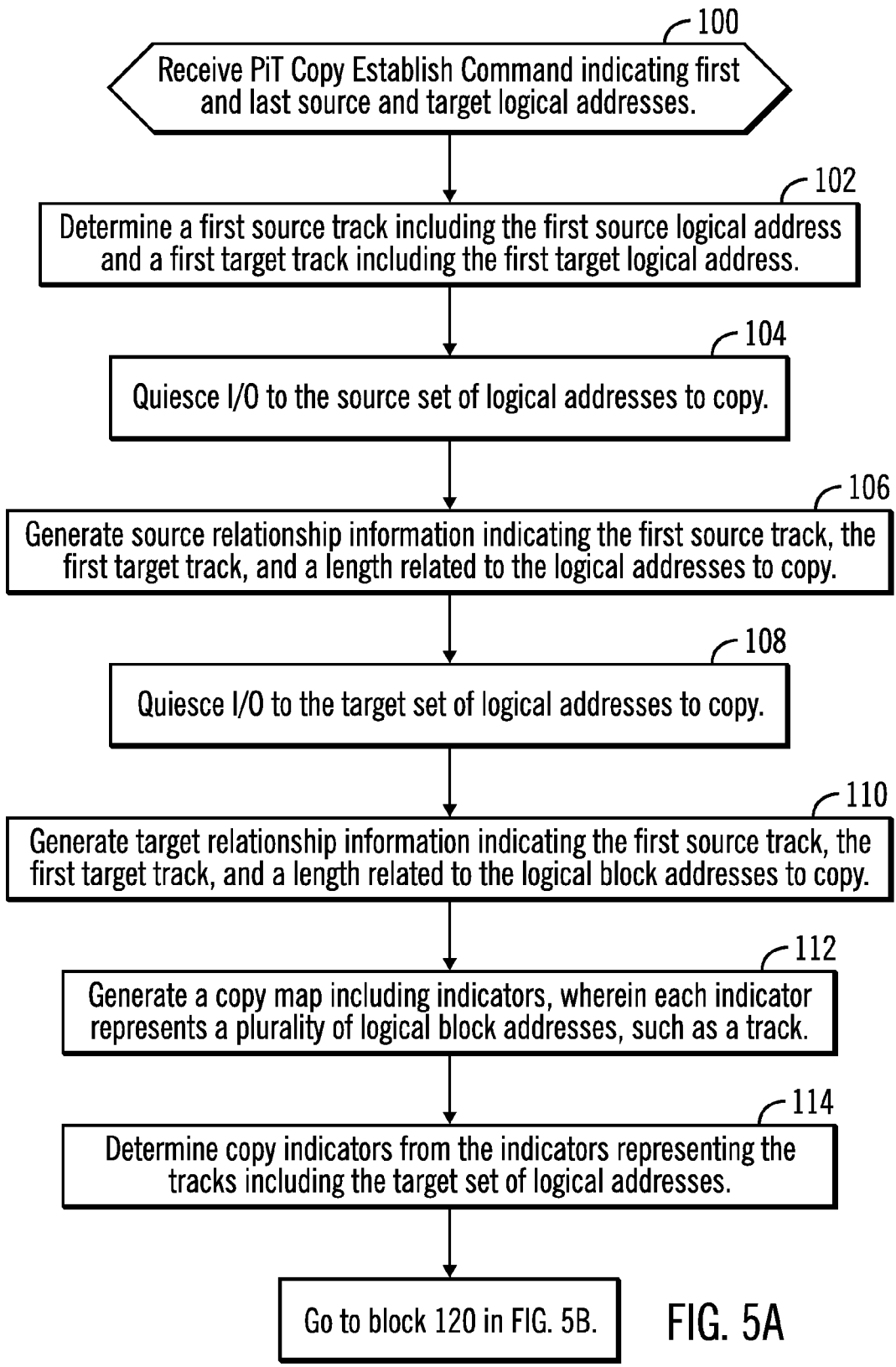
FIGS. 5a and 5b illustrate an embodiment of operations to establish a PiT copy relationship.
Figure 5B:
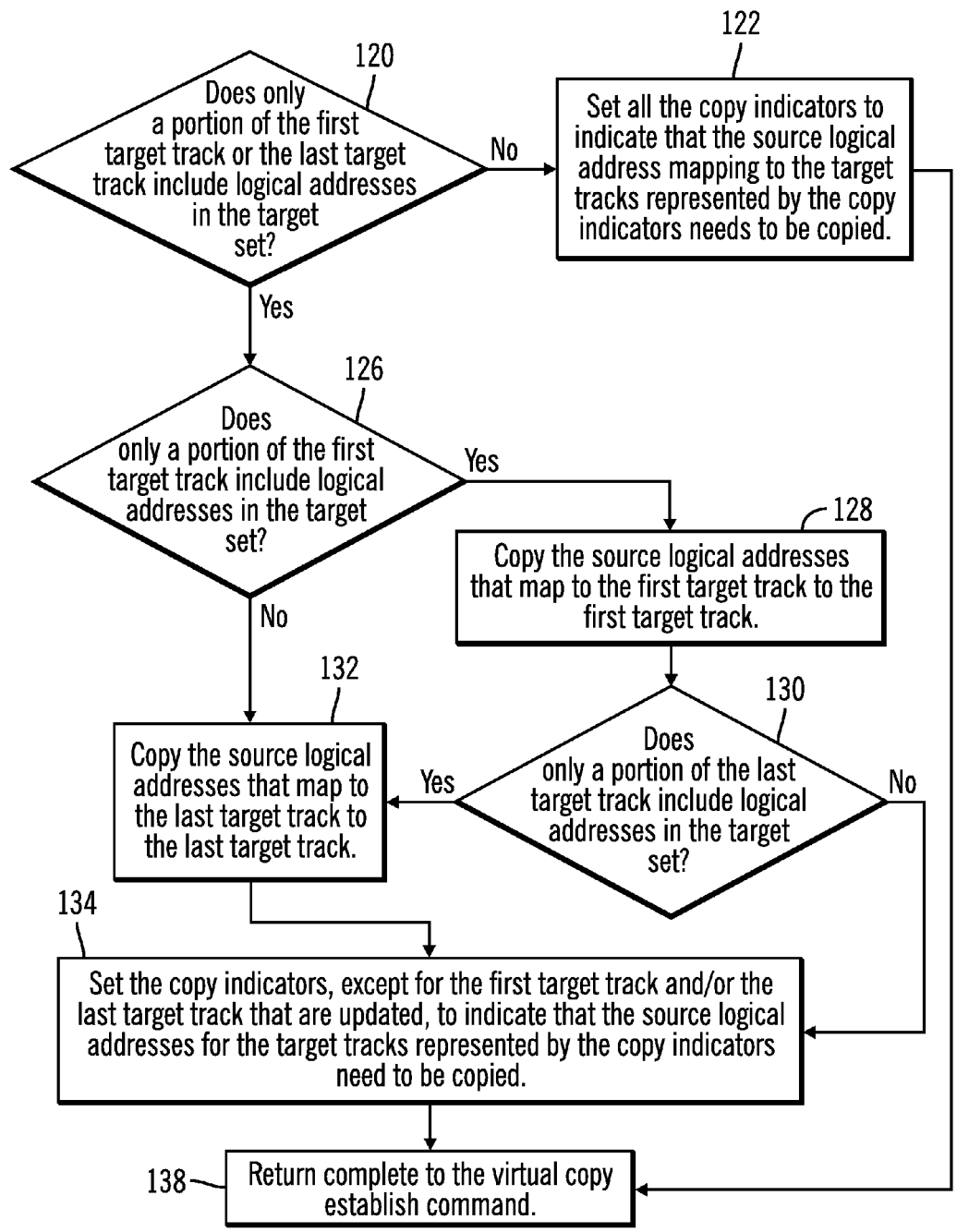

FIGS. 5a and 5b illustrate an embodiment of operations performed by the copy manager 12 to process a PiT copy establish command 50 to establish a PiT copy relationship 14, such as a FlashCopy establish command, e.g., FCESTABL. With respect to FIG. 5a, the copy manager 12 receives (at block 100) a PiT Copy Establish Command 50 indicating the first 54 and last 56 source logical addresses and the first 58 and last 60 target logical addresses. The copy manager 12 determines (at block 102) a first source track including the first source logical address 54 and a first target track including the first target logical address 56 to which the data is copied. The copy manager 12 would use a volume map to determine the mapping of logical addresses to tracks in the storages 4a, 4b. The copy manager 12 quiesces (at block 104) Input/Output (I/O) operations to the source set of logical addresses to copy. The copy manager 12 then generates (at block 106) source relationship information 20 indicating the first source track 74, the first target track 76, and the length 78 related to the logical block addresses to copy. The copy manager 12 further quiesces (at block 108) I/O operations to the target set of logical addresses to be updated. The copy manager 12 generates (at block 110) target relationship information 24 indicating the first source logical address 74, the first target logical address 76, and a number of logical addresses to copy 78. In the quiesce operations at block 104 and 108, the copy manager 12 may quiesce I/O to only the determined source set and target set of logical addresses to copy or to tracks including the source and target sets of logical addresses. Alternatively, the queisce of I/O may be to the entire volumes 6a, 6b.

The copy manager 12 generates (at block 112) a copy map 24 including indicators, e.g., cells, wherein each indicator represents a plurality of logical block addresses, such as a track. The copy manager 12 determines (at block 114) copy indicators comprising indicators in the copy map 24 representing the tracks including the target set of target logical addresses. With respect to FIG. 5b, the copy manager 12 determines (at block 120) whether only a portion of the first target track or the last target track, in the range of tracks including the target set, includes target logical addresses in the target set. If not, which means the source logical addresses to copy line up and fill each track including the target set of logical addresses, then the copy manager 12 sets (at block 122) all the copy indicators to indicate that the source logical addresses mapping to the target tracks represented by the copy indicators need to be copied.

If (from the yes branch of block 120) only a portion of the first or last target track includes logical addresses in the target set, then the copy manager 12 copies the data for those target tracks that only partially include target set logical addresses as part of establishing the PiT copy relationship 14. The copy map 24 will not indicate to copy the first or last target tracks updated as part of the establish command. In this way writes to a portion of the target track that did not include the logical addresses in the target set will not be copied as part of the PiT relationship because they copy map 24 will not indicate that the target tracks partially including PiT data need to be copied. If (at block 126) only a portion of the first target track includes logical addresses in the target set, then the copy manager 12 copies (at block 128) the source logical addresses that map to the first target track to the first target track. If (at block 130) only a portion of the last target track includes logical addresses in the target set or if (from the no branch of block 126) the first target track does not only partially store logical addresses of the target set, then the copy manager 12 copies (at block 132) the source logical address in the source set that map to the last target track to the last target track.

After copying logical addresses for the first and/or last target track (from block 132 or the no branch of block 130), the copy manager 12 sets (at block 134) the copy indicators, except for the first target track and/or the last target track that are updated, to indicate that the source logical addresses for the target tracks represented by the copy indicators needs to be copied, e.g., to one. The copy indicators for the first and/or last target track that are updated at blocks 128 and/or 132 are not set to indicate that the source tracks need to be copied. After generating the PiT relationship information and data structure (from block 122 or 130), such as the copy map 24 and after copying source logical addresses in the source set that map to partial filled first and/or last target tracks (from blo9ck 134), complete is returned (at block 138) to the application or user that initiated the PiT copy establish command 50.

In an alternative embodiment where the copy map 24 indicates source tracks having the source set of logical addresses, if the source set of source logical addresses maps to only a portion of a first source track and/or a last source track including a portion of the source set of logical addresses, then the first source track and/or the last source track only partially filled with PiT logical addresses are copied to at least one of the corresponding target tracks as part of the PiT establish relationship operation. In such case, the copy map 24 would not indicate that the first and/or last source tracks need to be copied. Further, in this alternative embodiment, the returning of the complete to the virtual copy establish command is performed in response to copying the first source track and/or the last source track to the corresponding target tracks.

After the PiT copy relationship 14 is established, hosts (not shown) may submit writes to the controller 2 for source logical addresses in the source volume 6a including data in one of the established PiT copy relationships 14. The writing of data to a source logical address in a PiT copy relationship 14 that has not been copied to the target volume 6b would trigger the copy manager 12 to perform a copy-on-write operation to copy data at the source logical addresses in the copy relationship 14 to the target storage 6b before they are updated so as to preserve the PiT relationship.

In certain described embodiments, upon receiving a write to a source logical address in a copy relationship 14, the copy manager 12 determines a target group of target logical addresses also in the copy relationship, such as a target track, that include the source logical address to update. The copy manager 12 determines the source logical addresses corresponding to the target logical addresses in the target group, and copies the determined source logical addresses to the determined target group. In this way, the mapping of the source and target logical addresses in the relationship information 70 is used to determine the source logical addresses in the copy relationship 14 that need to be copied to the target storage 6b. This type of mapping is performed because in certain described embodiments the source logical addresses in the source set are in source tracks that may be different numbered tracks than the target tracks including the target set of logical addresses to be updated by the source logical addresses in the destage group.

Figure 6:
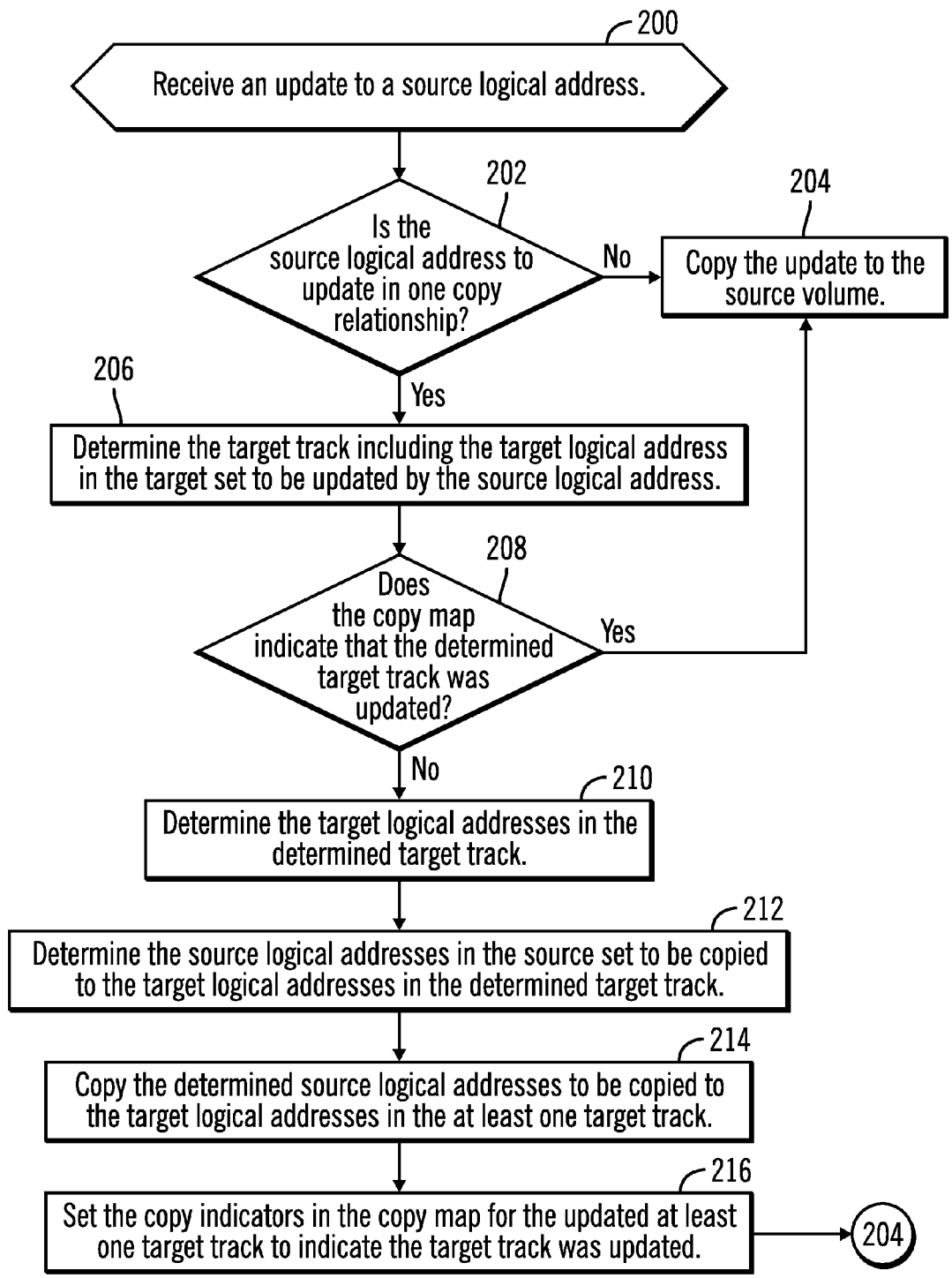
FIG. 6 illustrates an embodiment of operations to process an update to a source logical address in a PiT copy relationship.

FIG. 6 illustrates an embodiment of operations performed by the copy manager 12 to process an update to a source logical address in a source volume 6a. If a write request is directed to multiple source logical addresses, then the operations of FIG. 6 may be performed for each source logical address in the write. Upon receiving (at block 200) the update, the copy manager 12 considers the source relationship information 20 to determine (at block 202) whether the source logical address to update is within the range of source logical addresses, as defined by the first source logical address 74 and the number logical addresses 78 (FIG. 3), in one PiT copy relationship 14. If not, the copy manager 12 copies (at block 204) the update to the source volume 6*a*. If (at block 202) the source logical address to update is in one PiT copy relationship 14, then the copy manager 12 determines (at block 206) the target track including the target logical address in the target set to be updated by the source logical address being updated. This may be determined from the target relationship information 22 by determining the target logical address corresponding to the source logical address to update from the ranges of source logical addresses and target logical addresses as defined by the first source logical address 74, the second target logical address 76 and the number logical addresses to copy 78.

The copy manager 12 then determines (at block 208) whether they copy map 24 for the PiT copy relationship 14 being considered indicates that the determined target, e.g., target group, track was updated, i.e., whether the bit or indicator for the determined target track, or target group, indicates the target track was updated. The indicator may indicate the track was updated if it does not indicate the track needs to be updated or if it has a value indicating the track is current. If (from the yes branch of block 208) the determined target track to which the source logical address to update is to be copied has been updated, then the PiT data for the source logical address has already been copied to the determined target track (target group) and control proceeds to block 204 to write the update to the source logical address in the source volume 6*a*.

If (at block 208) the copy map 24 indicates the determined target track has not been updated, then the copy manager 12 determines (at block 210) the target logical addresses in the determined target track having the target logical address to update. The copy manager 12 determines (at block 212) the source logical addresses in the source set to be copied to the target logical addresses in the at least one target track. The determined source logical addresses are then copied (at block 214) to the determined target logical addresses in the target track or target group. The at least one copy indicator in the copy map 24 for the updated target track is set (at block 216) to indicate that the at least one target track was updated. After the target track is updated, control proceeds to block 204 to apply the update to the source logical address.

With the described embodiments of FIG. 6, an update to source logical addresses is processed by determining the source track including the source logical addresses that will be destaged together. The target tracks having the source logical addresses to be destaged together is then determined, and then source logical addresses are copied to corresponding target logical addresses in the copy relationship as part of performing a copy-on-write for the updated source track.

Once the copying of the source logical addresses to the at least one target track is confirmed, the source track having the source logical address to update is destaged to the source track, so that the point-in-time data is destaged and not overwritten with newer data.

Figure 7:
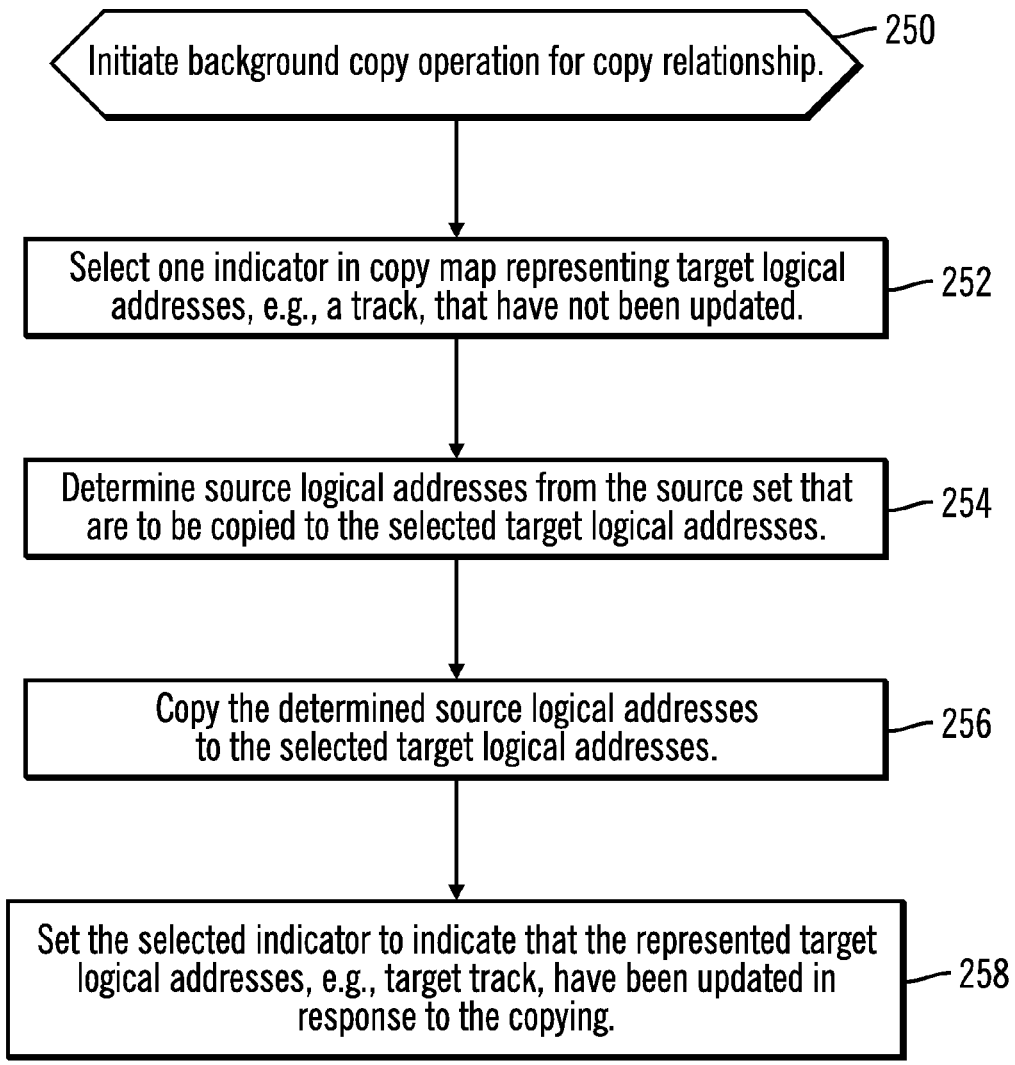
FIG. 7 illustrates an embodiment of operations to perform a background copy operations for a PiT copy relationship.

FIG. 7 illustrates an embodiment of operations performed by the copy manager 12 to copy source logical addresses to target logical addresses in the copy relationship as part of a background copy operation if the establish command 50 indicates a background copy operation 62. The background copy operation is performed to copy all the source logical addresses in the PiT copy relationship 14 to the target volume 6*b* to provide a redundant copy of the source logical addresses. Upon initiating (at block 250) the background copy operation, the copy manager 12 selects (at block 252) one indicator, e.g., bit, in the copy map 24 representing target logical addresses, e.g., a track, that have not been updated. The copy manager 12 may select a bit in the copy map 24 that that is adjacent in the copy map 24 to the last selected bit to update sequential target tracks. in the target volume 6*b*. The copy manager 12 determines (at block 254) source logical addresses from the source set that are to be copied to the selected target logical addresses. This may be determined from the source relationship information 20 from the source and target logical address ranges defined in the source relationship information 20, by determining the source logical addresses in the source range that correspond to the selected target logical addresses.

The determined source logical addresses are copied (at block 256) to the selected target track and then the selected indicator in the copy map 24 is set (at block 258) to indicate that the target track has been updated.

The described embodiments provide techniques for allowing a PiT copy establish operation to specify source and target logical addresses that map to source and target tracks having the specified source and target logical block addresses, respectively. In described embodiments, a first and/or last of the source tracks including the source logical addresses may only have a portion of the source logical addresses to copy and a first and last of the target tracks including the target logical addresses may only have a portion of the target logical addresses. In such case, the source logical addresses that map to only a portion of the first and/or last target tracks are copied to the first and/or last target tracks during the establish operation. Further, the copy map indicating target tracks that need to be updated with source tracks does not indicate that data needs to be copied for the first and/or last target tracks for which the source logical addresses are copied during the establish operation.

The described embodiments further provide techniques for handling updates to source logical addresses in a PiT copy relationship. Because source tracks are destaged in a destage group, such as a track, including the updated source logical address, the described embodiments determine the target tracks having the target logical addresses in the PiT copy relationship that are updated by source logical addresses in the source track being destaged. The source logical addresses are then copied to the corresponding target logical addresses in the determined at least one target track in the PiT copy relationship.

Described embodiments further provide techniques for performing a background copy operation of source logical addresses in a PiT copy relationship by determining a copy indicator representing a target track, determining the source logical addresses that map to the target logical addresses in the target track in the PiT copy relationship, and then copying the determined source logical addresses to the target track. The described embodiments allow the managing of updates and background copy operations for source logical addresses in a PiT copy relationship when source and target data are expressed as logical addresses and when different ranges of source and target logical addresses are specified.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for copying data involving at least one storage, wherein the computer program product comprises a non-transitory computer readable storage medium having computer readable program code embodied therein that executes to cause operations, the operations comprising:

processing a point-in-time (PiT) copy establish command specifying a source set comprising a subset of source logical addresses in a source volume in the at least one storage and a target set comprising a subset of target logical addresses in a target volume in the at least one storage, wherein the target set of target logical addresses maps to only a portion of at least one of a first target track and a last target track of the target tracks, wherein the source set of source logical addresses are copied to the target set of target logical addresses, wherein the source logical addresses map to source tracks and wherein the target logical addresses map to target tracks;

generating, in response to processing the PiT copy establish command, copy information by:

generating a copy map including a plurality of indicators, wherein each of the indicators represents a plurality of the target logical addresses;

determining copy indicators from the indicators representing the target set of logical addresses; and setting at least one of the copy indicators, except for the copy indicators for the at least one of the first target track and the last target track, to indicate that the source logical addresses mapping to the target logical addresses represented by the copy indicators needs to be copied as part of the PiT establish copy operation, and wherein the copy indicators for the at least one of the first target track and the last target track indicate that the source logical address mapping to the target track do not need to be copied;

copying the source logical addresses that map to at least one of the first target track and the last target track to at least one of the first target track and the last target track; and returning complete to the PiT copy establish command after generating the copy information and before copying all the source logical addresses to the target logical addresses.

2. The computer program product of claim 1, wherein the source tracks including the source set are different numbered tracks than the target tracks including the target set of logical addresses.

3. The computer program product of claim 1, wherein logical addresses comprises logical block addresses (LBAs) and wherein the source tracks and the target tracks are in a same volume or in different volumes in the at least one storage.

4. The computer program product of claim 1, wherein generating the copy information comprises:

generating a copy map including a plurality of indicators, wherein each of the indicators represents a plurality of the source logical addresses or the target logical addresses;

determining copy indicators from the indicators representing the source set of logical addresses or the target set of logical addresses; and setting at least one of the copy indicators to indicate that the source or target logical addresses represented by the copy indicator need to be copied as part of the PiT establish copy operation.

5. The computer program product of claim 1, wherein the returning of the complete to the PiT copy establish command is performed in response to copying the source logical addresses in the source set that map to the at least one of the first target track and the last target track.

6. The computer program product of claim 1, wherein generating the copy information comprises:

quiescing Input/Output (I/O) requests to the source tracks:

generating source relationship information, in response to quiescing the I/O requests to the source set, indicating a first source logical address, a first target logical address, and a number of logical block addresses to copy;

quiescing I/O requests to the target set;

generating target relationship information, in response to quiescing the I/O requests to the target set, indicating a first source logical address, a first target logical address, and a number of logical block addresses to copy; and allowing I/O requests to the source set and the target set in response to generating the source relationship information and the target relationship information.

7. A computer program product for copying data involving at least one storage, wherein the computer program product comprises a non-transitory computer readable storage medium having computer readable program code embodied therein that executes to cause operations, the operations comprising:

processing a point-in-time (PiT) copy establish command specifying a source set comprising a subset of source logical addresses in the at least one storage and a target set comprising a subset of target logical addresses in the at least one storage, wherein the source set of source logical addresses are copied to the target set of target logical addresses, wherein the source logical addresses map to source tracks and wherein the target logical addresses map to target tracks;

generating, in response to processing the PiT copy establish command, copy information indicating the source set of source logical addresses and the target set of target logical addresses and indicating whether the source logical addresses in the source set have been copied to the target set, wherein the target set maps to only a portion of at least one of a first target track and a last target track of the target tracks including the target set; and returning complete to the PiT copy establish command after generating the copy information and before copying all the source logical addresses to the target logical addresses.

8. The computer program product of claim 7, wherein the operations further comprise:

copying the source logical addresses in the source set mapping to at least one of the first target track and the last target track to the at least one of the first and last target track, wherein the returning of the complete to the PiT copy establish command is performed in response to copying the source logical addresses in the source set mapping to only a portion of the at least one of the first target track and the last target track.

9. A computer program product for copying data involving at least one storage, wherein the computer program product comprises a non-transitory computer readable storage medium having computer readable program code embodied therein that executes to cause operations, the operations comprising:

processing a point-in-time (PiT) copy establish command specifying a source set comprising a subset of source logical addresses in the at least one storage and a target set comprising a subset of target logical addresses in the at least one storage, wherein the source set of source logical addresses are copied to the target set of target logical addresses, wherein the source logical addresses map to source tracks and wherein the target logical addresses map to target tracks;

generating, in response to processing the PiT copy establish command, copy information indicating the source set of source logical addresses and the target set of target logical addresses and indicating whether the source logical addresses in the source set have been copied to the target set, wherein the source set of source logical addresses maps to only a portion of at least one of a first source track and a last source track including a portion of the source set of logical addresses;

returning complete to the PiT copy establish command after generating the copy information and before copying all the source logical addresses to the target logical addresses; and copying the at least one of the first source track and the last source track to at least one of the corresponding target tracks, wherein the returning of the complete to the PiT copy establish command is performed in response to copying the at least one of the first source track and the last source track to the at least one of the corresponding target tracks.

10. A system for copying data involving at least one storage, comprising:

a processor; and a computer readable storage medium including computer program code executed by the processor to perform operations, the operations comprising:

processing a point-in-time (PiT) copy establish command specifying a source set comprising a subset of source logical addresses in a source volume in the at least one storage and a target set comprising a subset of target logical addresses in a target volume in the at least one storage, wherein the target set of target logical addresses maps to only a portion of at least one of a first target track and a last target track of the target tracks, wherein the source set of source logical addresses are copied to the target set of target logical addresses, wherein the source logical addresses map to source tracks and wherein the target logical addresses map to target tracks;

generating, in response to processing the PiT copy establish command, copy information by:

generating a copy map including a plurality of indicators, wherein each of the indicators represents a plurality of the target logical addresses;

determining copy indicators from the indicators representing the target set of logical addresses; and setting at least one of the copy indicators, except for the copy indicators for the at least one of the first target track and the last target track, to indicate that the source logical addresses mapping to the target logical addresses represented by the copy indicators needs to be copied as part of the PiT establish copy operation, and wherein the copy indicators for the at least one of the first target track and the last target track indicate that the source logical address mapping to the target track do not need to be copied;

copying the source logical addresses that map to at least one of the first target track and the last target track to at least one of the first target track and the last target track; and returning complete to the PiT copy establish command after generating the copy information and before copying all the source logical addresses to the target logical addresses.

11. The system of claim 10, wherein the source tracks including the source set are different numbered tracks than the target tracks including the target set of logical addresses.

12. The system of claim 10, wherein generating the copy information comprises:

quiescing Input/Output (I/O) requests to the source tracks:

generating source relationship information, in response to quiescing the I/O requests to the source set, indicating a first source logical address, a first target logical address, and a number of logical block addresses to copy;

quiescing I/O requests to the target set;

generating target relationship information, in response to quiescing the I/O requests to the target set, indicating a first source logical address, a first target logical address, and a number of logical block addresses to copy; and allowing I/O requests to the source set and the target set in response to generating the source relationship information and the target relationship information.

13. A system for copying data involving at least one storage, comprising:

a processor; and a computer readable storage medium including computer program code executed by the processor to perform operations, the operations comprising:

processing a point-in-time (PiT) copy establish command specifying a source set comprising a subset of source logical addresses in the at least one storage and a target set comprising a subset of target logical addresses in the at least one storage, wherein the source set of source logical addresses are copied to the target set of target logical addresses, wherein the source logical addresses map to source tracks and wherein the target logical addresses map to target tracks;

generating, in response to processing the PiT copy establish command, copy information indicating the source set of source logical addresses and the target set of target logical addresses and indicating whether the source logical addresses in the source set have been copied to the target set, wherein the target set maps to only a portion of at least one of a first target track and a last target track of the target tracks including the target set; and returning complete to the PiT copy establish command after generating the copy information and before copying all the source logical addresses to the target logical addresses.

14. The system of claim 13, wherein the operations further comprise:
copying the source logical addresses in the source set mapping to at least one of the first target track and the last target track to the at least one of the first and last target track, wherein the returning of the complete to the PiT copy establish command is performed in response to copying the source logical addresses in the source set mapping to only a portion of the at least one of the first target track and the last target track.

15. A method for copying data involving at least one storage, comprising:
processing a point-in-time (PiT) copy establish command specifying a source set comprising a subset of source logical addresses in a source volume in the at least one storage and a target set comprising a subset of target logical addresses in a target volume in the at least one storage, wherein the target set of target logical addresses maps to only a portion of at least one of a first target track and a last target track of the target tracks, wherein the source set of source logical addresses are copied to the target set of target logical addresses, wherein the source logical addresses map to source tracks and wherein the target logical addresses map to target tracks;
generating, in response to processing the PiT copy establish command, copy information by:
generating a copy map including a plurality of indicators, wherein each of the indicators represents a plurality of the target logical addresses;
determining copy indicators from the indicators representing the target set of logical addresses; and
setting at least one of the copy indicators, except for the copy indicators for the at least one of the first target track and the last target track, to indicate that the source logical addresses mapping to the target logical addresses represented by the copy indicators needs to be copied as part of the PiT establish copy operation, and wherein the copy indicators for the at least one of the first target track and the last target track indicate that the source logical address mapping to the target track do not need to be copied;
copying the source logical addresses that map to at least one of the first target track and the last target track to at least one of the first target track and the last target track; and
returning complete to the PiT copy establish command after generating the copy information and before copying all the source logical addresses to the target logical addresses.

16. The method of claim 15, wherein the source tracks including the source set are different numbered tracks than the target tracks including the target set of logical addresses.

17. The method of claim 15, wherein generating the copy information comprises:
quiescing Input/Output (I/O) requests to the source tracks:
generating source relationship information, in response to quiescing the I/O requests to the source set, indicating a first source logical address, a first target logical address, and a number of logical block addresses to copy;
quiescing I/O requests to the target set;
generating target relationship information, in response to quiescing the I/O requests to the target set, indicating a first source logical address, a first target logical address, and a number of logical block addresses to copy; and
allowing I/O requests to the source set and the target set in response to generating the source relationship information and the target relationship information.

18. A method for copying data involving at least one storage, comprising:
processing a point-in-time (PiT) copy establish command specifying a source set comprising a subset of source logical addresses in the at least one storage and a target set comprising a subset of target logical addresses in the at least one storage, wherein the source set of source logical addresses are copied to the target set of target logical addresses, wherein the source logical addresses map to source tracks and wherein the target logical addresses map to target tracks;
generating, in response to processing the PiT copy establish command, copy information indicating the source set of source logical addresses and the target set of target logical addresses and indicating whether the source logical addresses in the source set have been copied to the target set, wherein the target set maps to only a portion of at least one of a first target track and a last target track of the target tracks including the target set; and
returning complete to the PiT copy establish command after generating the copy information and before copying all the source logical addresses to the target logical addresses.

19. The method of claim 18, further comprising:
copying the source logical addresses in the source set mapping to at least one of the first target track and the last target track to the at least one of the first and last target track, wherein the returning of the complete to the PiT copy establish command is performed in response to copying the source logical addresses in the source set mapping to only a portion of the at least one of the first target track and the last target track.

* * * * *